United States Patent [19]
Maetani et al.

[11] Patent Number: 5,976,250
[45] Date of Patent: Nov. 2, 1999

[54] APPARATUS FOR TREATING A CORD FOR USE IN A POWER TRANSMISSION BELT AND METHOD FOR TREATING SUCH A CORD

[75] Inventors: Masakastu Maetani; Shinji Kotani; Haruyuki Tsubaki; Takashi Masuda, all of Hyogo, Japan

[73] Assignee: Mitsuboshi Belting Ltd., Kobe, Japan

[21] Appl. No.: 08/810,084

[22] Filed: Mar. 3, 1997

[51] Int. Cl.⁶ ................................................. B05C 11/00
[52] U.S. Cl. ..................... 118/67; 118/65; 118/DIG. 19
[58] Field of Search ............... 68/5 D, 5 E; 242/47.08, 242/47.09, 157 R; 226/104; 118/423, 68, 424, 65, 67, 64, DIG. 12

[56] References Cited

U.S. PATENT DOCUMENTS

| | | | |
|---|---|---|---|
| 1,444,079 | 4/1923 | Maring | 118/DIG. 19 |
| 1,786,416 | 12/1930 | Martindell | 118/DIG. 19 |
| 2,122,403 | 7/1938 | Fuller | 118/DIG. 19 |
| 2,345,544 | 3/1944 | Worthington | 242/157 R |
| 3,058,681 | 10/1962 | Clarkson | 242/47.09 |
| 3,933,545 | 1/1976 | Wilkinson et al. | 118/420 |
| 4,860,999 | 8/1989 | Ritter et al. | . |
| 4,905,626 | 3/1990 | Berthold et al. | 118/419 |
| 4,919,395 | 4/1990 | Ritter et al. | 242/47.08 |
| 5,221,879 | 6/1993 | Taniguchi et al. | . |
| 5,350,981 | 9/1994 | Taniguchi et al. | . |

*Primary Examiner*—Brenda A. Lamb
*Attorney, Agent, or Firm*—Wood, Phillips, VanSanten, Clark & Mortimer

[57] ABSTRACT

An apparatus for simultaneously treating a plurality of cords for use in power transmission belts. The apparatus has a heating chamber, heated air in the chamber, and a guide system for simultaneously guiding a first cord in a first predetermined path and a second cord in a second predetermined path through the heating chamber. The guide system has at least a first roller with a first axis and first structure for causing the first cord and the second cord to move at least partially around the axis of the first roller progressively axially relative to the first roller as the first cord moves in the first predetermined path and the second cord moves in the second predetermined path through the heating chamber.

20 Claims, 6 Drawing Sheets

APPARATUS FOR TREATING A CORD FOR USE IN A POWER TRANSMISSION BELT AND METHOD FOR TREATING SUCH A CORD

BACKGROUND OF THE INVENTION

1. Field of The Invention

This invention relates to cords of the type used in power transmission belts and, more particularly, to an apparatus for pretreating the cords, as by the steps of applying a liquid substance thereto, and curing the substance. The invention is also directed to the method of treating cords through this type of apparatus.

2. Background Art

It is known to use load carrying cords in all types of power transmission belts, i.e. V-belts, V-ribbed belts, toothed belts, etc., and particularly those used in industrial applications. Typically, the cords are made from fiber material, such as polyester fiber, aramid fiber, glass fiber, and the like. To improve adhesion with the belt rubber, it is known to pretreat the fiber cords. For example, it is known to treat the cords with resorcinol formalin latex (RFL) alone or to use the RFL treatment after pretreating the cords with an epoxy or isocyanate compound. It is also known to adhere rubber gum after the RFL treatment.

It is further known to either individually treat a cord or simultaneously treat a plurality of cords by applying a substance thereto and heating the cords to cure the applied substance. In those portions of a treating apparatus in which multiple passes of the cord are required, such as in the heating chamber, guiding rollers for the cords have been arranged in multiple stages so that the cords follow a circuitous path through the heating chamber. For example, the cords may be wrapped in an "S" shape around the various rollers. The multiple cords travel together in substantially parallel relationship through the paths.

With this multiple stage arrangement, the cords are separately threaded on independent sets of rollers to move through an apparatus in parallel relationship with a fixed spacing and are not required to move back and forth in the same plane. This facilitates cord mounting and rethreading of the cords.

However, because of the above multiple stage arrangement, the overall apparatus may be undesirably large. This may result in an increase in the cost of the apparatus, as well as a need for a large amount of operating space, which is often at a premium. This design also has some safety problems associated with setup, maintenance, and periodic cord inspection.

Apparatus for processing a single cord are shown in Japanese Unexamined Patent Publication No. H4-146232 and Japanese Unexamined Patent Publication No. H4-146230. In these apparatus, a cord is directed in a back and forth pattern around a pair of rollers. The single processed cord is wound between the rollers several times and moves axially thereof as the cord is advanced. While these systems eliminate problems associated with multiple stages, they do not permit the simultaneous processing of multiple cords.

Another problem with prior art apparatus is that the treating substance adhered to the cords may foul certain operating elements of the apparatus. For example, when the cords are dip processed in a liquid, the liquid may harden and accumulate on roller surfaces, particularly those first contacting the cords after dipping. The adhered liquid may accumulate progressively to the point that the diameter of the roller appreciably increases. Without making adjustments elsewhere in the system, the cord tension thus becomes higher than intended. The adhered liquid may also cause a contamination problem.

To eliminate this problem, the heating temperature in prior art systems has been raised. It is also known to reduce the processing speed to increase the heating time and to extend the length of the heating ovens. However, certain temperatures produce optimum cord properties. By altering this temperature, the quality of the cord may be compromised. By reducing the processing speed, the capability of the apparatus is reduced. By extending the oven length, the overall size of the equipment may be increased, increasing costs and necessary operating space. Such modifications may make system inspection more difficult, which could ultimately result in a compromise in system safety.

SUMMARY OF THE INVENTION

In one form of the invention, an apparatus is provided for simultaneously treating a plurality of cords for use in power transmission belts. The apparatus has a heating chamber, heated air in the chamber, and a guide system for simultaneously guiding a first cord in a first predetermined path and a second cord in a second predetermined path through the heating chamber. The guide system has at least a first roller with a first axis and first structure for causing the first cord and the second cord to move at least partially around the axis of the first roller progressively axially relative to the first roller as the first cord moves in the first predetermined path and the second cord moves in the second predetermined path through the heating chamber.

Simultaneous cord treatment permits an efficient apparatus to be designed in a relatively small space.

The apparatus may have a second roller with a second axis with the first structure causing a) the first cord to move in a spiral path around the first and second rollers as the first cord moves in the first predetermined path through the heating chamber and b) the second cord to move in a spiral path around the first and second rollers as the second cord moves in the second predetermined path through the heating chamber.

In one form, the first and second axes are substantially parallel to each other.

The first and second rollers may reside outside of the heating chamber.

In one form, the heating chamber has an inlet and an outlet, one of the first and second rollers is adjacent to the heating chamber inlet, and the other of the first and second rollers is adjacent to the heating chamber outlet.

In one form, the guide system guides a cord in a substantially straight first path portion into the heating chamber and a substantially straight second path portion from the heating chamber, with the first and second straight path portions being substantially parallel to each other and at substantially a right angle to the first and second axes.

In one form, the first cord passes between the first and second rollers at least three times as the first cord moves in the first predetermined path through the heating chamber.

In one form, the first roller has first and second roller elements which are rotatable relative to each other around the first axis. Each of the first and second roller elements is simultaneously engaged by first and second cords moving in the first and second predetermined paths.

In one form, the first and second roller elements each have an annular shape with a cylindrical outer surface and the outer surface on one of the first and second rollers elements has a groove formed therein within which a first cord moving in the first predetermined path moves.

In one form, the outer surface of the other of the first and second roller elements has no groove formed therein.

The invention also contemplates the above apparatus in combination with first and second cords for use in a power transmission belt.

The invention still further contemplates that the apparatus can include a cord dip structure with a supply of a coating through which a first cord moving in the first predetermined path passes before entering the heating chamber.

The invention further contemplates the apparatus in combination with a take-up structure for continuously accumulating a first cord moving in the first predetermined path after passing through the heating chamber.

In one form, the first and second predetermined paths are substantially parallel through the heating chamber.

In one form, the first roller has first and second roller elements which are rotatable relative to each other around the first axis, with the first and second roller elements each being engaged by both the first and second cords moving in the first and second predetermined paths. The cylindrical outer surface on one of the first and second roller elements has first and second grooves formed therein with the first and second cords residing one each in the first and second grooves as the first and second cords move in the first and second predetermined paths.

In one form, the outer surface of the other of the first and second roller elements has no groove formed therein and there are a plurality of pins arranged in a zig-zag pattern through which at least one of the first and second cords passes before moving against the outer surface of the other of the first and second roller elements. The pins can be arranged to pass a splice connection in a cord without significant impedance.

In one form, the apparatus has a front side on which an operator is located to operate the apparatus and a rear, side with the front and rear sides being spaced axially with respect to the first axis. The first structure causes the first cord to move axially toward the front of the apparatus as the first cord moves through the heating chamber in the first predetermined path.

In another form, an apparatus is provided for simultaneously treating a plurality of cords for use in a power transmission belt, which apparatus includes a heating chamber, structure for heating air in the heating chamber, and a guide system for guiding a first cord in a first predetermined path through the heating chamber and a second cord in a second predetermined path through the heating chamber. The guide system includes a first roller with a first axis and a second roller with a second axis. The first and second rollers each have an annular shape with a cylindrical outer surface. As the first and second rollers rotate around the first and second axes, a first cord moving in the first predetermined path travels around the first and second rollers and shifts axially relative to both the first and second axes and a second cord moving in the second predetermined path travels around the first and second rollers and shifts axially relative to both the first and second axes.

The inventive structure lends itself to the formation of a versatile, relatively low volume unit, for which there has been recent demand. At the same time, the apparatus can be constructed so that its safe setup, repair and maintenance are facilitated.

The invention further contemplates a method of treating first and second cords for use in a power transmission belt, which method includes the steps of: providing first and second elongate cords; providing a heating chamber; applying a treating substance to the first and second elongate cords; directing the first elongate cord in a first predetermined path through the heating chamber in a spiral path; directing the second elongate cord in a second predetermined path through the heating chamber in a spiral path; directing the first elongate cord in the first predetermined path out of the heating chamber; and directing the second elongate cord in the second predetermined path out of the heating chamber.

The method may further include the step of incorporating at least a part of the first elongate cord into a power transmission belt after the part of the first elongate cord is heated in the heating chamber.

DETAILED DESCRIPTION OF THE DRAWINGS

Figure 1:
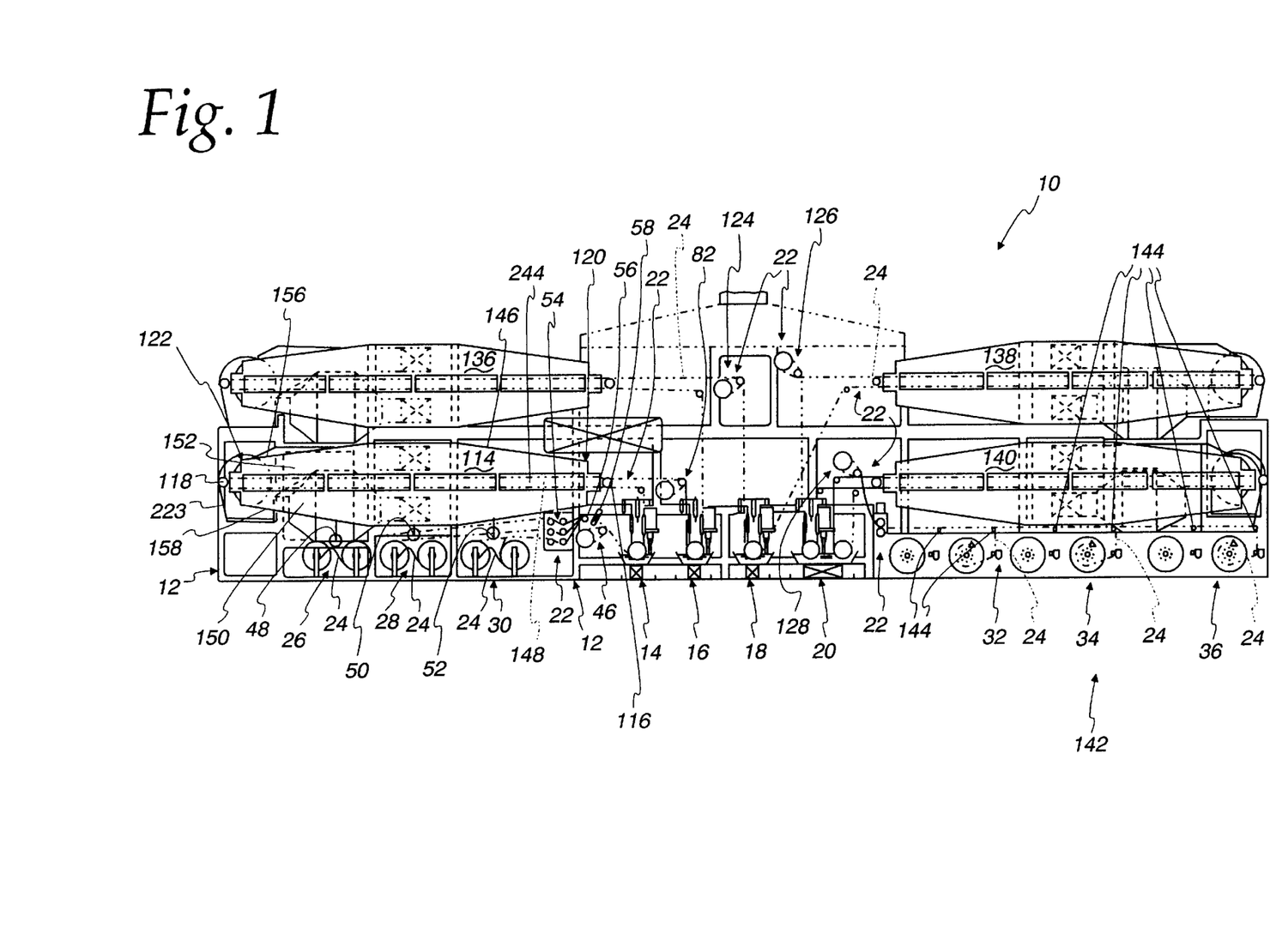
FIG. 1 is a front elevation, partial cross-sectional view of an apparatus for treating cords for use in power transmission belts, according to the present invention.
Figure 2:
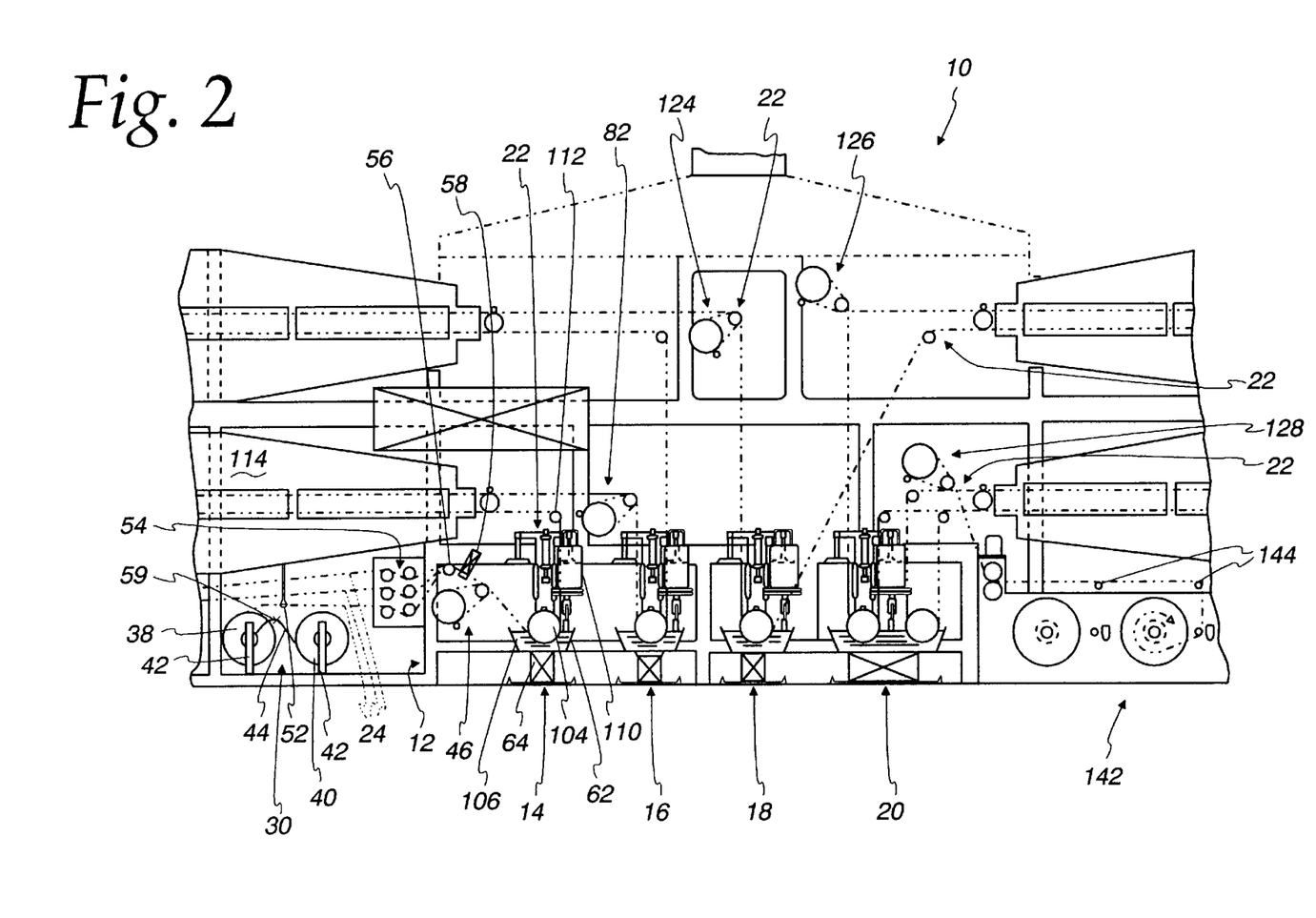
FIG. 2 is an enlarged, fragmentary, front elevation, partial cross-sectional view of a central portion of the apparatus in FIG. 1.

In FIGS. 1 and 2, an apparatus for treating cords for use in power transmission belts, according to the present invention, is shown at 10. The apparatus 10 consists of a frame 12 which supports four dip processing units 14, 16, 18, 20. A guide system 22 guides multiple (in this case three) cords 24, simultaneously from bulk supplies 26, 28, 30 serially through the dip processing units 14, 16, 18, 20 to take-up units 32, 34, 36, at which the processed cords 24 are accumulated. Through the guide system 22, the plurality of cords 24 are simultaneously guided in a like plurality of predetermined paths between the supplies 26, 28, 30 and the take-up units 32, 34, 36.

The bulk supplies 26, 28, 30 are each the same. Exemplary bulk supply 30 consists of separate cheese bobbins 38, 40 supported on a creel stand 42. A leader cord 44 connects to trailing and leading ends on the cords 24 on the cheese bobbins 38, 40.

The cords 24 are simultaneously drawn off of the supplies 26, 28, 30 by a driving roller assembly 46, as seen in FIGS.

1, 2, 4 and 5. Above each supply 26, 28, 30 a support/guide ring 48, 50, 52 is provided, between the supplies 26, 28, 30 and the driving roller assembly 46. Between the support/guide rings 48, 50, 52 and the driving roller assembly 46 are provided pairs of friction tensioners 54 which apply a slight tension to the cords 24. The cords 24, after passing the friction tensioners 54, pass over a guide roller 56. Between the guide roller 56 and the driving roller assembly 46 is a detector 58 which identifies the passing of a splice connection 59 on the cords 24. The detector 58 may be any device suitable for detecting the presence of the splice connection 59. For example, an optical detector could be used for this purpose. The cords 24 progress from the driving roller assembly 46 into a dip tank 62 on a support 64 making up the dip processing unit 14.

Figure 4:
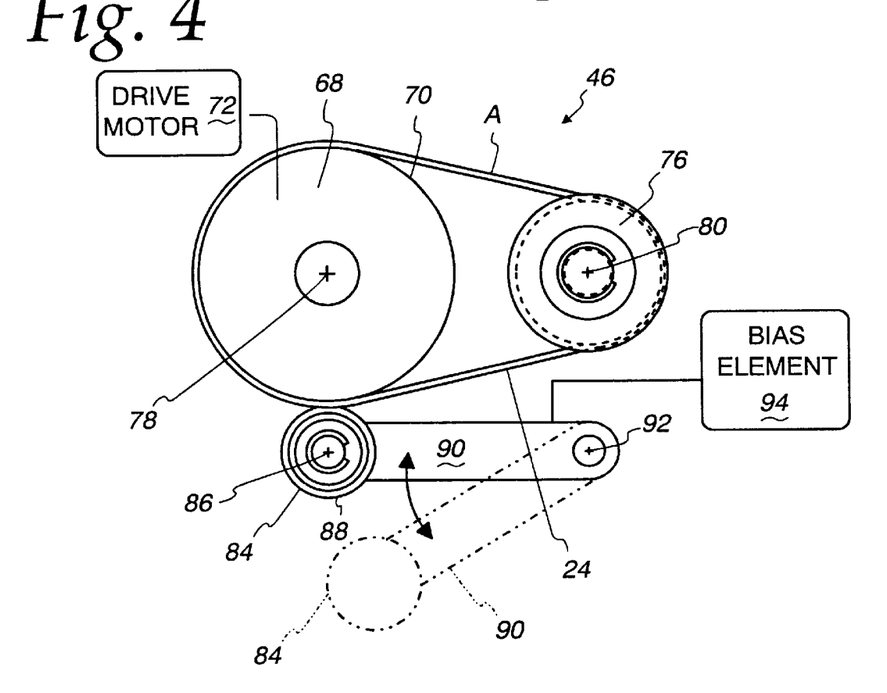
FIG. 4 is an enlarged, fragmentary, front elevation view of a cord driving subassembly on the apparatus in FIGS. 1 and 2.
Figure 5:
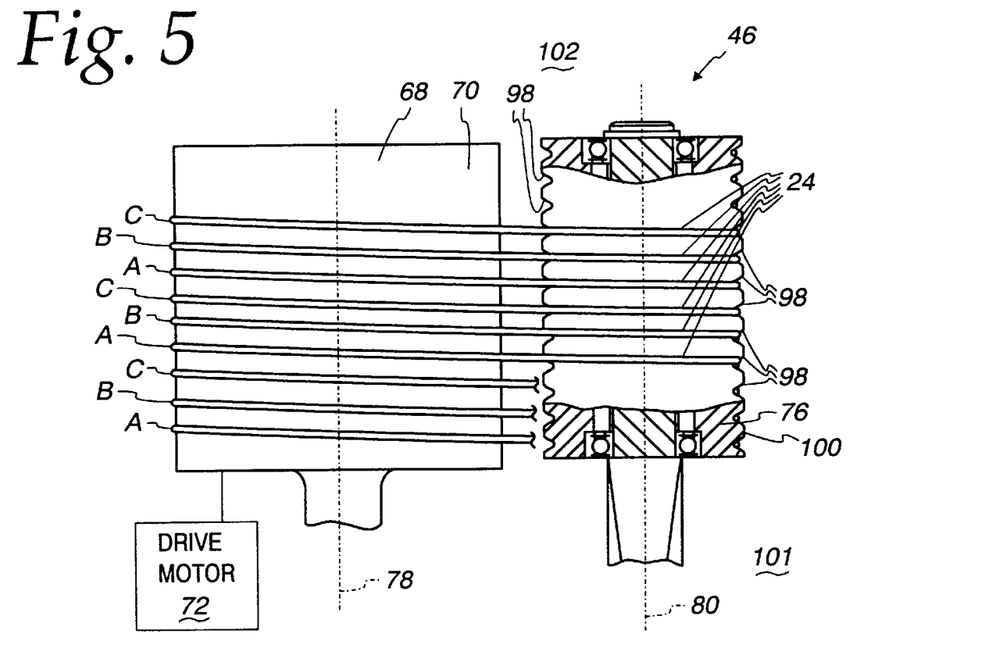
FIG. 5 is a plan view of the cord driving subassembly in FIG. 4.

The driving roller assembly 46, as seen most clearly in FIGS. 4 and 5, consists of a driving roller 68 having a smooth, cylindrical, outer surface 70 that is driven by a variable speed drive motor 72. The driving roller assembly 46 further includes a grooved guide roller 76 situated so that the driving roller 68 and guide roller 76 rotate about spaced, parallel axes 78, 80, respectively. The cords 24, identified as A, B, C, in FIG. 5, are each wrapped several times, in this case three times, around the driving rollers 68 and guide roller 76 to produce a positive frictional force between the cords 24 and the rollers 68, 76. This arrangement also avoids slackening of the cords 24 as a result of a tension produced on the cords 24 through a second driving roller assembly 82 (FIG. 2), downstream of the driving roller assembly 46.

A pinch roller 84 is biasably pressed against the outer surface 70 of the driving roller 68 and presses the cords 24 there against. The pinch roller 84 has a length along its axis 86 sufficient to simultaneously engage all cords 24 wrapped around the drive roller 68. The pinch roller 84 has a cylindrical shape with an outer layer 88 made of a soft resin or rubber. The pinch roller 84 is mounted on an arm 90 which pivots about an axis 92 between solid and phantom line positions in FIG. 4. A bias element 94, such as a spring or a cylinder, urges the arm 90 toward the solid line position in FIG. 4. Normally, the roller 84 is retracted to an open position, shown in phantom lines in FIG. 4. By biasing the roller 84 against the outer surface 70, slackening of the cords 24 is prevented. The roller 84 also prevents shifting of the cords 24 axially along the driving roller 68.

The three cords 24 are fitted one each into spiral grooves 98 formed in the outer surface 100 of the guide roller 76. The grooves 98 have a regular and fixed axially spacing. In this case, each cord 24 is wrapped in a spiral pattern around the rollers 68, 76 in every third groove so that the cords travel in parallel, predetermined spiral patterns around the rollers 68, 76. In the event that fewer than three cords 24 are used, the same pattern is used for the one or two cords 24. For example, if there are two cords 24 used, the A and B cords would move in the same grooves 98, with the grooves 98 being previously occupied by the C cord being empty.

The apparatus 10 has a front side 101 and a rear side 102. The operator of the apparatus 10 resides at the front side 101 of the apparatus 10 to thread the cords 24, inspect the cords 24, fill the dip tank 62, etc. The cords 24 are routed so that they move axially relative to the rollers 68, 76 from the rear side 102 to the front side 101 of the apparatus 10 for ease of maintenance and inspection.

Figure 3:
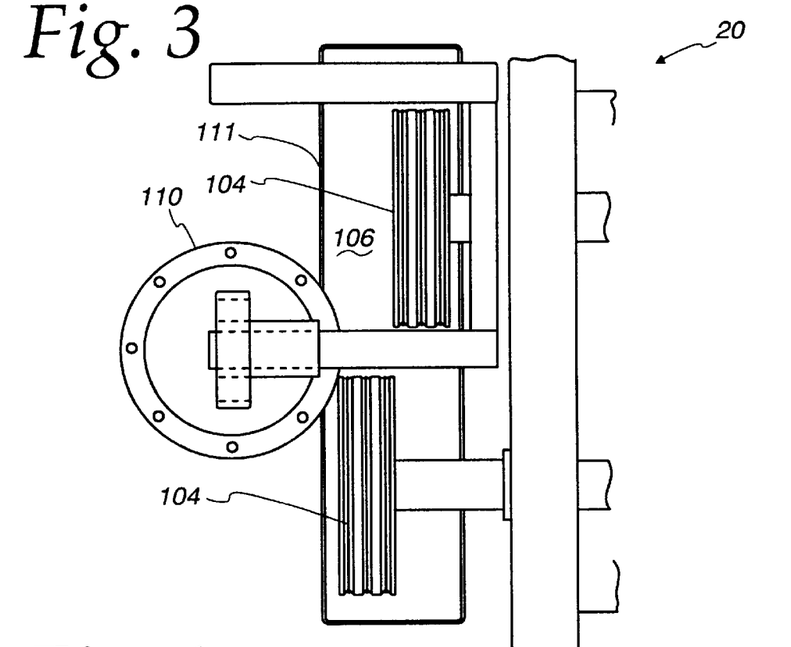
FIG. 3 is an enlarged, fragmentary, plan view of a dip structure for applying a treating substance to a cord on the apparatus in FIGS. 1 and 2.

As seen in FIG. 2, the cords 24 wrap around approximately one-half the circumference of a dip roller 104, which is immersed in a processing liquid 106 in the dip tank 62. The liquid supply in the tank 62 is continuously replenished by liquid in a storage tank 110, which keeps the level of liquid in the tank 108 substantially constant at a predetermined level. In FIG. 3, the dip processing unit 20 is shown with two dip rollers 104 in a wider tank 111 in which processing liquid 106 is retained and supplied from a like storage tank 110. In this unit 20, dip processing takes place two times, whereas dip processing takes place only one time in each of the other units 14, 16, 18.

As seen in FIGS. 1 and 2, from the dip tank 62, the cords 24 move upwardly and wrap around approximately one-quarter of the circumference of a guide roller 112 and horizontally into an elongate drying oven 114. As described in greater detail below, the cords 24 are caused to move back and forth several times within the drying oven 114 between rollers 116, 118 at the ends 120, 122 of the drying oven 114. In the oven 114, the cords 24 are heated to dry the liquid 106 applied thereto. The cord 24 are cooled in the atmosphere as they discharge from the drying oven at the oven end 120. The cords 24 exiting the drying oven 114 move to the second driving roller assembly 82, which is likewise operable selectively at different speeds. The speed of the second driving roller assembly 82 is determined by monitoring the speed of the driving roller assembly 46 and matching the speed of the second driving roller assembly 82 to that of the driving roller assembly 46. Third, fourth, and fifth downstream driving roller assemblies 124, 126, 128 also have speed control capabilities incorporated therein. The speed of each driving roller assembly 124, 126, 128 is monitored and matched to the speed of the immediately upstream driving roller assembly 124, 126.

The apparatus 10 can be used to process the cords 24 in a number of different manners. The precise manner selected depends upon the nature of the substance being applied to the cords 24. For example, different forms of processing liquid can be used, i.e. pre-dip liquid, RFL liquid, and soaking liquid. Different drying temperatures and cord tensions can be chosen as well. In this case, three additional dip processing units 16, 18, 20 are provided downstream of the dip processing unit 14. The cords 24 can be dip processed in any one or all of the dip processing units 14, 16, 18, 20 followed by heat treating in the drying oven 114 and/or one or all of the additional three ovens 136, 138, 140 downstream of the oven 114. The invention contemplates that a single dip processing procedure, up to four dip processing procedures, can be carried out followed by heat treating in one to four of the ovens 114, 136, 138, 140, followed by cooling outside of the ovens 114, 136, 138, 140.

After dip processing and heating, the cords 24, as seen in FIGS. 1 and 2, are directed to the take-up units 32, 34, 36. In the take-up section 142 of the apparatus 10, the cords 24 pass over six guide rollers 144 and from there are directed for accumulation on the take-up units 32, 34, 36.

Each oven 114, 136, 138, 140 is substantially the same in construction and uses a forced air, indirect heating. Exemplary oven 114 will now be described with respect to FIGS. 1 and 6–10. The oven 114 has a housing 146 defining an internal air flow space. The housing 146 has an internal heating/drying chamber 148 through which the cords 24 pass during treatment. Beneath the heating/drying chamber 148 is a hot air supply chamber 150 which communicates with the heating/drying chamber 148. A hot air recovery chamber 152 is located above, and communicates with, the heating/drying chamber 148. Incoming heated air is communicated from the hot air supply chamber 150 to the heating/drying chamber 148 to the hot air recovery chamber 152.

Figure 7:
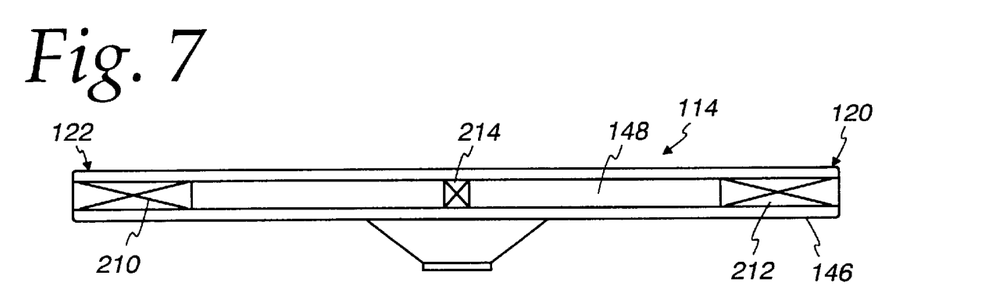
FIG. 7 is a cross-sectional view of the drying oven taken along line 7—7 of FIG. 6.

The housing 146 and chambers 148, 150, 152 are substantially symmetrical about a vertical plane 154. The heating/drying chamber 148 has a substantially uniform cross section. Each of the chambers 150, 152 has a substantially uniform cross section in the vicinity of the center plane 154 and tapers progressively toward each of the ends 120, 122 of the oven 114. The angle θ of inclination of the top wall 156 and bottom wall 158 is between 5–30°. This arrangement causes a uniform flow speed of hot air travelling through the hot air supply chamber 150 and hot air recovery chamber 152 so as to prevent combustible gas, such as toluene, from stagnating at locations in the hot air supply chamber 150 and hot air recovery chamber 152.

The sloping arrangement of the top and bottom walls 156, 158 also provides useable space, as to facilitate compact nesting of other components, such as the bulk cord supplies 26, 28, 30, the take-up units 32, 34, 36, control panels, and other components. This makes possible the designing of a compact, overall system.

A partition 160 separates the hot air supply chamber 150 from the heating/drying chamber 148. The partition 160 has a plurality of slit-shaped openings/slits 162 therethrough which extend in parallel relationship for substantially the entire length of the oven 114 between the ends 120, 122 thereof. The slit-shaped openings/slits 162 are provided on the rear side 163 of the oven 114 at which the cords 24 enter. In the embodiment shown, the openings 162 are provided over approximately one-half the front to rear dimension of the oven 114. Through this arrangement, the heated air can be concentrated on the incoming cords 124 which have undried processing liquid 106 thereon. The slit-shaped openings 162 are defined between vertically extending flat surfaces 164, 166 on adjacent, spaced partitions 168. The cords 24 are centered in a front to rear direction between the surfaces 164, 166 so that the heated air is funnelled thereby to directly against the cords 24. The hot air blown through the openings 162 is normally moving at a speed of 5–30 meters per second. Preferably, the width of the slit-shaped openings (W) is 3–10 mm, with the spacing of the openings being 5–30 mm.

Figure 9:
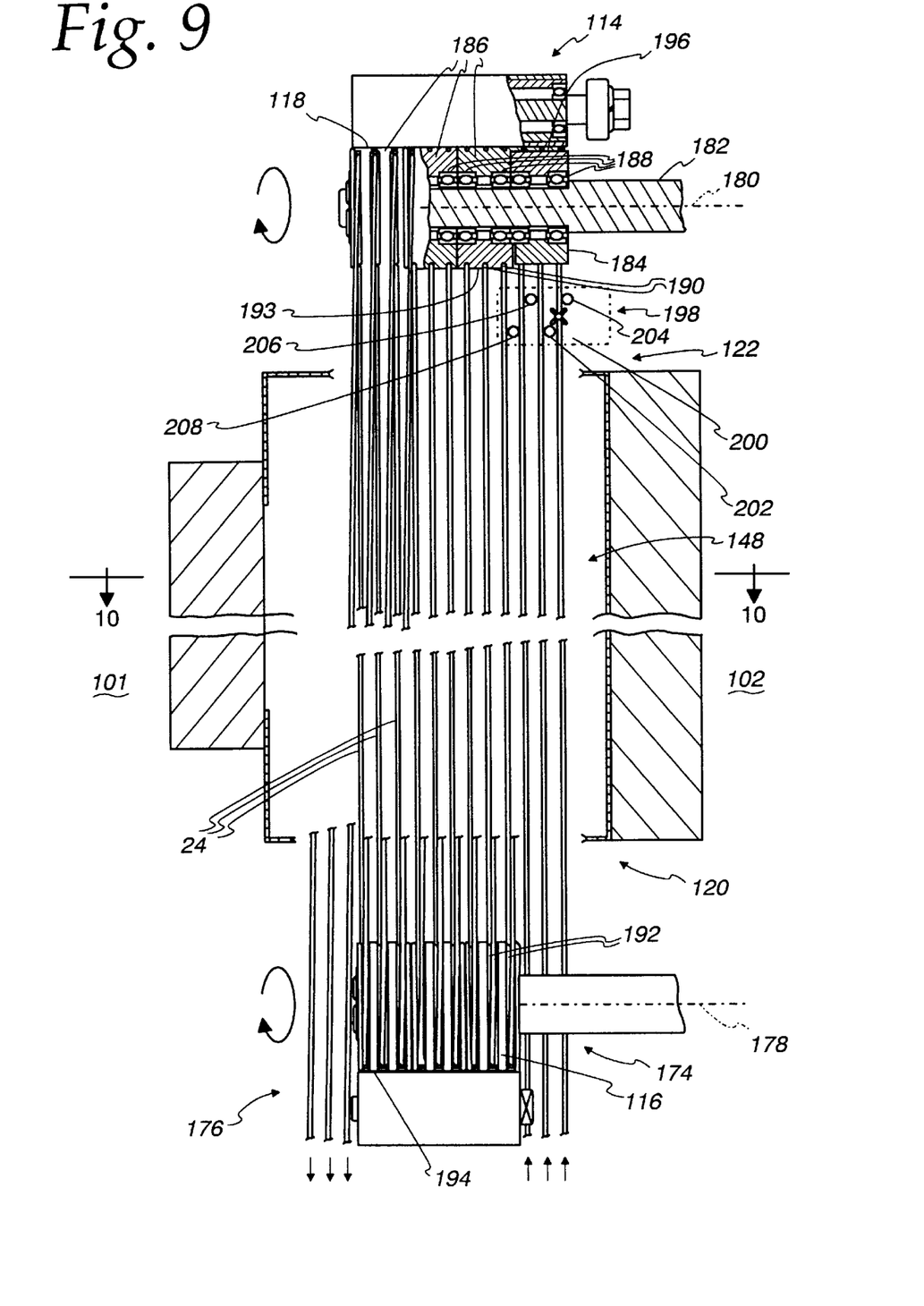
FIG. 9 is an enlarged, fragmentary, partial cross-sectional view of the drying oven in FIGS. 7 and 8 with cords being directed therethrough.

The guide rollers 116, 118 are disposed outside of the drying oven 114 adjacent to the ends 120, 122 thereof The incoming cords 24 move in a first straight line path portion at 174. The cords 24 depart the drying oven 114 in a path portion at 176 that is substantially straight and parallel to the path portion at 174. Between the rollers 116, 118, the cords 24 move in substantially straight paths generally parallel to the length of the oven 114 between the ends 120, 122 thereof. More particularly, the cords 24 pass under the rollers 116, 118 as they enter the oven 114 to be in close proximity to the heated air from the hot air supply chamber 150. The cords 24 wrap approximately 180° around the roller 118 and extend over and then under the roller 116, wrapping through approximately 180°. The cords 24 continue this wrapping motion, wrapping over and under the roller 116 three times and under and over the roller 118 four times between the time that they enter and depart from the heating/drying chamber 148. The system is configured so that the cords 24 shift from rear to front an amount equal to the total number of cords×1 pitch dimension for each passage between the rollers 116, 118. In each wrapping motion, the cords 24 contact the rollers 118, 116 through approximately 180°. The cords 24 moving in their respective paths move progressively from the rear 102 to the front 101 of the oven 114 as the rollers 116, 118 are rotated around their respective axes 178, 180. In this manner, each of the cords 24 moves spirally in a predetermined pattern, with the cords 24 remaining substantially parallel to each other through the heating/drying chamber 148. With this arrangement, each cord 24 is caused to pass back and forth within the heating/drying chamber 148 several times, including multiple passes directly over the slit-shaped openings 162.

Figure 10:
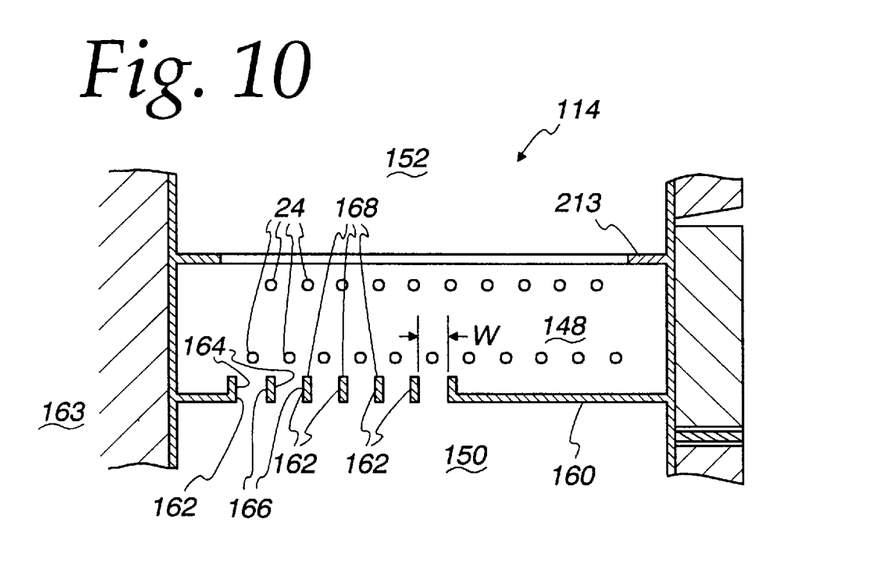
FIG. 10 is an enlarged, cross-sectional view of the drying oven taken along line 10—10 of FIG. 9.

The roller 118 consists of a shaft 182 upon which one roller element 184, having one configuration, and three roller elements 186 having a different configuration than the one roller 184, are coaxially mounted for rotation on bearings 188 interposed between the roller elements 184, 186 and the shaft 182. The roller elements 184, 186 have an axial dimension chosen so that they will each simultaneously accommodate the number (in this case three) of cords 24 simultaneously advanced through the apparatus 10. That is, each of the three cords 24 reside at all times on each of the roller elements 184, 186 so that the cord tension is uniform within the heating/drying chamber 148. Grooves 190, 192 are defined in the annular outer surfaces 193, 194 of the roller elements 186 and roller 116 at a predetermined spacing, with their being one cord 24 fitted in each groove 190, 192 as the system is operated. This maintains the desired parallel alignment of the cords 24 as they travel through the heating/drying chamber 48 in their predetermined paths. The roller element 184 has an annular outer surface 196 that is flat i.e. without grooves.

Immediately upstream of the roller element 184 is a cord separator 198. The cord separator 198 consists of a mounting plate 200 from which strategically located pins 202, 204, 206, 208 project upwardly in a zig-zag pattern. The pins 202-208 are spaced 20–30 mm in the lengthwise direction of the drying oven 114. With this arrangement, the pin pairs 202, 204; 202, 206; 206, 208 cooperate to align and guide the moving cords 24. With this arrangement, the splice connection 59 on the cords 24 will move without hangup through the cord separator 198.

The smooth surface 196 of the roller element 184 resists buildup of the processing liquid 106 with which the cords 24 are treated. Any of the liquid that does transfer to the surface 196 tends to disperse, rather than accumulate, thereby extending the running period for the apparatus 10 before regular maintenance of the guide roller 118 is required. Additionally, maintenance is facilitated by reason of the fact that the roller element 184 can be slid along the shaft 182 relative to the cords 24 without having to remove the cords 24.

Heated air from the heating/drying chamber 148 is communicated to the hot air recovery chamber 152 through openings 210, 212 at the ends 120, 122 of the drying oven 114 extending through a partition 213 separating the heating/drying chamber 148 from the hot air recovery chamber 152. The combined area of the openings 210, 212 is selected to be substantially equal to the combined area of the slit openings 162 through the partition 160 to cause even air flow. To adjust the temperature distribution in the heating/drying chamber 148, it is possible to use an auxiliary opening 214 between the openings 210, 212.

Figure 8:
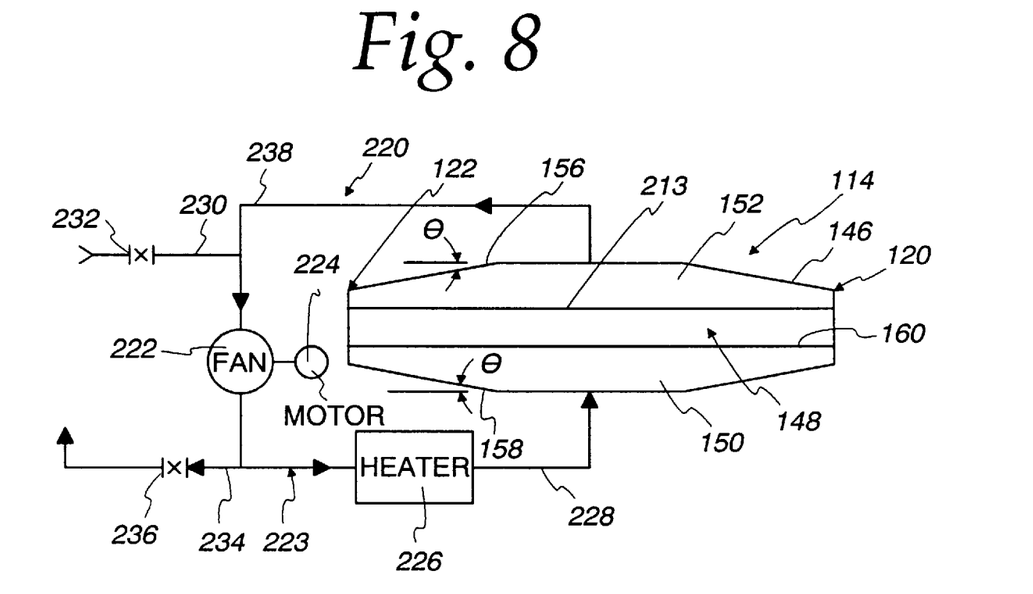
FIG. 8 is a schematic representation of a system for circulating heated air in the drying oven in FIG. 7.

A hot air circulating system for the drying oven 114 is shown at 220. The system 220 includes an air moving element/fan 222 in a duct system 223, which fan is operated by an electric motor 224. Air is forced by the fan 222 through a heater 226. Air heated by the heater 226 is directed through a conduit 228 into the hot air supply chamber 150. Outside air can be controllably delivered to the fan 222 through a conduit 230 which has an in-line damper 232. Air delivered by the fan 222 can be partially exhausted to the atmosphere through a conduit 234 controlled by an in-line damper 236. Air passing through the heating/drying chamber 148 to the hot air recovery chamber 152 is returned to the fan 222 via a conduit 238 to complete the circulation loop. The dampers 232, 236 can be manually operated or can be automatically operated in response to a pressure differential between the atmosphere and the system loop. Additional ventilation can be provided in conventional fashion between the interior of the housing 146 and the atmosphere.

In operation, heated air from the conduit 228 is delivered from the conduit 228 through an inlet opening 240 in the housing 146. The heated air branches from the opening 240 towards both ends 120, 122 of the drying oven 114. The tapering configuration of the chamber 150 avoids pressure reduction at the ends 120, 122 so that with a uniform incoming air speed, the heated air is propelled forcibly through the slit openings 162. By having the hot air flow into the heating/drying chamber 148 from the ends 120, 122, a uniform heating of the chamber 148 takes place.

The hot air blowing through the slit openings 162 travels vertically against the wet cords 24 and then branches laterally towards the ends 120, 122 from where it is discharged through the openings 210, 212 into the hot air recovery chamber 152. This accounts for a uniform heating of the cords 24 in the heating/drying chamber 148 while at the same time preventing combustible gases such as toluene from stagnating anywhere within the housing 146.

From the hot air recovery chamber 152, the air discharges from the housing 146 through an opening 242, which communicates with the conduit 238 for delivery back to the fan 222. The dampers 232, 234 are adjusted to control communication of air from the system to the atmosphere and from the atmosphere to the system. The concentration of combustible gas resulting from the vaporization of toluene or the like, used as a solvent in the processing liquid, is thus reduced, as a result of which system safety is enhanced.

Figure 6:
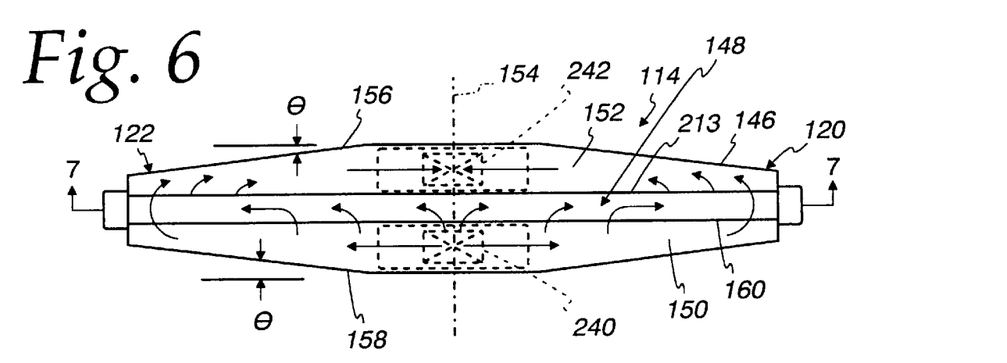
FIG. 6 is an enlarged, front elevation view of a drying oven on the apparatus in FIGS. 1 and 2.

The drying oven 114 has access doors 244 in the front side thereof. Temperature control devices, gas concentration detectors, and gas suction and discharge ducts (none of which are shown) can also be provided.

The foregoing disclosure of specific embodiments is intended to be illustrative of the broad concepts comprehended by the invention.

We claim:

1. An apparatus for simultaneously treating a plurality of cords for use in power transmission belts, said apparatus comprising:

a heating chamber;

a heater for air in the heating chamber; and a guide system through which a first cord and a second cord that is separate from the first cord are simultaneously guided through the heating chamber respectively in first and second predetermined and different paths, said guide system comprising at least a first roller with a first axis around which the first and second cords are spirally wrapped so that the first cord and the second cord move at least partially around the first axis and progressively axially relative to the first roller as the first cord moves in the first predetermined path and the second cord moves in the second predetermined path through the heating chamber, wherein the first and second predetermined paths overlap axially relative to the first axis.

2. The apparatus for simultaneously treating a plurality of cords according to claim 1, further comprising a second roller with a second axis around which the first and second cords are spirally wrapped so that a) the first cord moves in a spiral path around the first and second rollers as the first cord moves in the first predetermined path through the heating chamber and b) the second cord moves in a spiral path around the first and second rollers as the second cord moves in the second predetermined path through the heating chamber.

3. The apparatus for simultaneously treating a plurality of cords according to claim 2 wherein the first and second axes are substantially parallel to each other.

4. The apparatus for simultaneously treating a plurality of cords according to claim 2 wherein the first and second rollers each reside outside of the heating chamber.

5. The apparatus for simultaneously treating a plurality of cords according to claim 4 wherein the heating chamber has an inlet and an outlet, one of the first and second rollers is adjacent to the heating chamber inlet and the other of the first and second rollers is adjacent to the heating chamber outlet.

6. The apparatus for simultaneously treating a plurality of cords according to claim 5 wherein the guide system guides the first cord in a substantially straight first path portion into the heating chamber and a substantially straight second path portion from the heating chamber, and the first and second straight path portions are substantially parallel to each other and substantially at a right angle to the first and second axes.

7. The apparatus for simultaneously treating a plurality of cords according to claim 2 wherein the first cord passes between the first and second rollers at least three times as the first cord moves in the first predetermined path through the heating chamber.

8. The apparatus for simultaneously treating a plurality of cords according to claim 2 wherein the first roller comprises first and second roller elements which are rotatable relative to each other around the first axis, each said first and second roller element being simultaneously engaged by the first and second cords moving in the first and second predetermined paths.

9. The apparatus for simultaneously treating a plurality of cords according to claim 8 wherein the first and second roller elements each have an annular shape with a cylindrical outer surface and the outer surface on one of the first and second roller elements has a groove formed therein within which the first cord moving in the first predetermined path moves.

10. The apparatus for simultaneously treating a plurality of cords according to claim 1 in combination with the first and second cords for use in a power transmission belt mounted on the apparatus.

11. The apparatus for simultaneously treating a plurality of cords according to claim 10 wherein the apparatus has a front side on which an operator is located to operate the apparatus and a rear side, the front and rear sides are spaced axially with respect to the first axis and the first cord moves axially toward the front of the apparatus as the first cord moves through the heating chamber in the first predetermined path.

12. The apparatus for simultaneously treating a plurality of cords according to claim 1 wherein the first and second predetermined paths are substantially parallel to each other through the heating chamber.

13. An apparatus for simultaneously treating a plurality of cords for use in power transmission belts, said apparatus comprising:

a heating chamber;

a heater for air in the heating chamber; and a guide system through which a first cord and a second cord are simultaneously guided through the heating chamber respectively in first and second predetermined paths, said guide system comprising at least a first roller with a first axis around which the first and second cords are spirally wrapped so that the first cord and the second cord move at least partially around the first axis and progressively axially relative to the first roller as the first cord moves in the first predetermined path and the second cord moves in the second predetermined path through the heating chamber, wherein the first and second predetermined paths overlap axially relative to the first axis, the guide system further comprising a second roller with a second axis around which the first and second cords are spirally wrapped so that a) the first cord moves in a spiral path around the first and second rollers as the first cord moves in the first predetermined path through the heating chamber and b) the second cord moves in a spiral path around the first and second rollers as the second cord moves in the second predetermined path through the heating chamber, wherein the first roller comprises first and second roller elements which are rotatable relative to each other around the first axis each said first and second roller element being simultaneously engaged by the first and second cords moving in the first and second predetermined paths, wherein the first and second roller elements each have an annular shape with a cylindrical outer surface and the outer surface on one of the first and second roller elements has the groove formed therein within which a first cord moving in the first predetermined path moves, wherein the outer surface of the other of the first and second roller elements has no groove formed therein.

14. An apparatus for simultaneously treating a plurality of cords for use in power transmission belts, said apparatus comprising:

a heating chamber;

a heater for air in the heating chamber;

a guide system through which a first cord and a second cord are simultaneously guided through the heating chamber respectively in first and second predetermined paths, said guide system comprising at least a first roller with a first axis around which the first and second cords are spirally wrapped so that the first cord and the second cord move at least partially around the first axis and progressively axially relative to the first roller as the first cord moves in the first predetermined path and the second cord moves in the second predetermined path through the heating chamber, wherein the first and second predetermined paths overlap axially relative to the first axis; and a cord dip structure with a supply of a coating through which the first cord moving in the first predetermined path passes before entering the heating chamber.

15. The apparatus for simultaneously treating a plurality of cords according to claim 14 further comprising a take-up structure for continuously accumulating the first cord moving in the first predetermined path after passing through the heating chamber.

16. An apparatus for simultaneously treating a plurality of cords for use in power transmission belts, said apparatus comprising:

a heating chamber;

a heater for air in the heating chamber; and a guide system through which a first cord and a second cord are simultaneously guided through the heating chamber respectively in first and second predetermined paths, said guide system comprising at least a first roller with a first axis around which the first and second cords are spirally wrapped so that the first cord and the second cord move at least partially around the first axis and progressively axially relative to the first roller as the first cord moves in the first predetermined path and the second cord moves in the second predetermined path through the heating chamber, wherein the first and second predetermined paths overlap axially relative to the first axis, wherein the first and second predetermined paths are substantially parallel to each other through the heating chamber, wherein the guide system comprises a second roller with a second axis and the first and second cords each move in a spiral path around the first and second rollers as the first and second cords move in the first and second predetermined paths and the first roller comprises first and second roller elements which are rotatable relative to each other around the first axis, each said first and second roller element being simultaneously engaged by the first and second cords moving in the first and second predetermined paths, the first and second roller elements have an annular shape with a cylindrical outer surface and the outer surface of one of the first and second roller elements has first and second grooves formed therein with the first and second cords residing one each in the first and second grooves as the first and second cords move in the first and second predetermined paths.

17. The apparatus for simultaneously treating a plurality of cords according to claim 16 wherein the outer surface of the other of the first and second roller elements has no groove formed therein and there are a plurality of pins arranged in a zig-zag pattern through which at least one of the first and second cords passes before moving against the outer surface of the other of the first and second roller elements.

18. An apparatus for simultaneously treating a plurality of cords for use in power transmission belts, said apparatus comprising:

a heating chamber;

a heater for air in the heating chamber;

a guide system through which a first cord and a second cord are simultaneously guided through the heating chamber respectively in first and second predetermined paths, said guide system comprising at least a first roller with a first axis around which the first and second cords are spirally wrapped so that the first cord and the second cord move at least partially around the first axis and progressively axially relative to the first roller as the first cord moves in the first predetermined path and the second cord moves in the second predetermined path through the heating chamber, wherein the first and second predetermined paths overlap axially relative to the first axis, the guide system further comprising a second roller with a second axis around which the first and second cords are spirally wrapped so that a) the first cord moves in a spiral path around the first and second rollers as the first cord moves in the first predetermined path through the heating chamber and b) the second cord moves in a spiral path around the first and second rollers as the second cord moves in the second predetermined path through the heating chamber, wherein the first roller comprises first and second roller elements which are rotatable relative to each other around the first axis, each said first and second roller element being simultaneously engaged by the first and second cords moving it the first and second predetermined paths; and a predetermined plurality of cords including the first and second cords for use in a power transmission belt that move in a plurality of predetermined paths including the first and second predetermined paths in substantially parallel relationship through the heating chamber, wherein the first and second roller elements each have an annular shape with a cylindrical outer surface, and the predetermined plurality of cords simultaneously move against each of the first and second roller elements as the predetermined plurality of cords advance in the predetermined paths.

19. An apparatus for simultaneously treating a plurality of cords for use in a power transmission belt, said apparatus comprising:

a heating chamber;

a heater for air in the heating chamber; and a guide system for guiding a first cord in a first predetermined path through the heating chamber and a second cord in a second predetermined path through the heating chamber, said guide system comprising a first roller with a first axis and an axial extent and a second roller with a second axis, said first and second rollers each having an annular shape with a cylindrical outer surface, said cylindrical outer surfaces being configured so that as the first and second rollers rotate around the first and second axes the first cord moving in the first predetermined path travels around the first and second rollers and shifts axially relative to both the first and second axes and the second cord moving in the second predetermined path travels around the first and second rollers and shifts axially relative to both the first and second axes, wherein a part of the first cord moving in the first predetermined path resides between first and second parts of the second cord moving in the second predetermined path along the axial extent of the first roller.

20. The apparatus for simultaneously treating a plurality of cords according to claim 19 wherein the cylindrical outer surfaces are configured and relatively positioned so that the second cord moves in the second predetermined path substantially parallel to the first predetermined path through the heating chamber.

* * * * *